US010862576B2

(12) United States Patent
Hu et al.

(10) Patent No.: US 10,862,576 B2
(45) Date of Patent: Dec. 8, 2020

(54) TRANSMITTER AND RELAY COMMUNICATION DEVICES FOR D2D COMMUNICATION

(71) Applicant: Huawei Technologies Co., Ltd., Shenzhen (CN)

(72) Inventors: Liang Hu, Munich (DE); Mohamed Ibrahim, Munich (DE); Josef Eichinger, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/423,707

(22) Filed: May 28, 2019

(65) Prior Publication Data
US 2019/0280761 A1 Sep. 12, 2019

Related U.S. Application Data

(63) Continuation of application No. PCT/EP2016/079000, filed on Nov. 28, 2016.

(51) Int. Cl.
| | |
|---|---|
| H04B 7/155 | (2006.01) |
| H04W 76/14 | (2018.01) |
| H04W 24/08 | (2009.01) |
| H04W 88/04 | (2009.01) |
| H04L 1/00 | (2006.01) |

(52) U.S. Cl.
CPC ........ *H04B 7/15557* (2013.01); *H04W 24/08* (2013.01); *H04W 76/14* (2018.02); *H04L 2001/0097* (2013.01); *H04W 88/04* (2013.01)

(58) Field of Classification Search
CPC .. H04B 7/15557; H04W 76/14; H04W 24/08; H04W 88/04; H04W 4/70; H04L 2001/0097
See application file for complete search history.

(56) References Cited

U.S. PATENT DOCUMENTS

| 10,660,115 B1* | 5/2020 | Marupaduga ..... H04W 72/1215 |
| 2005/0014464 A1* | 1/2005 | Larsson .............. H04L 25/0224 455/11.1 |

(Continued)

FOREIGN PATENT DOCUMENTS

| CN | 1547862 A | 11/2004 |
| CN | 106100716 A | 11/2016 |

(Continued)

OTHER PUBLICATIONS

Polyanskiy et al., "Channel Coding Rate in the Finite Blocklength Regime", Apr. 19, 2010, IEEE Transactions on Information Theory ( vol. 56 , Issue: 5 , May 2010 ), pp. 1-53 (Year: 2010).*

(Continued)

*Primary Examiner* — Paul H Masur
(74) *Attorney, Agent, or Firm* — Leydig, Voit & Mayer, Ltd.

(57) ABSTRACT

The disclosure relates to a transmitter communication device for a D2D communication network with a plurality of communication devices, including one or more receiver communication devices and a plurality of relay communication devices. The transmitter communication device comprises: a processor configured to select a subset of plurality of relay communication devices for relaying a communication message to the one or more receiver communication devices and to configure the subset of relay communication devices to relay the communication message using one of a plurality of relay modes, including a first relay mode or a second relay mode, wherein the first relay mode is an "amplify and forward" relay mode and wherein the second relay mode is a "decode and forward" relay mode; and a communication interface configured to transmit the communication message to the one or more receiver communication devices via the subset of relay communication devices.

19 Claims, 22 Drawing Sheets

(56) References Cited

U.S. PATENT DOCUMENTS

| | | | |
|---|---|---|---|
| 2007/0002766 A1 | 1/2007 | Park et al. | |
| 2007/0217432 A1 | 9/2007 | Molisch et al. | |
| 2009/0047901 A1 | 2/2009 | Yu et al. | |
| 2009/0092073 A1 | 4/2009 | Doppler et al. | |
| 2011/0273999 A1 | 11/2011 | Nagaraja | |
| 2012/0322362 A1 | 12/2012 | Coon | |
| 2013/0315133 A1* | 11/2013 | Wang | H04W 40/22 370/315 |
| 2014/0241254 A1* | 8/2014 | Kaur | H04W 76/14 370/329 |
| 2015/0133132 A1* | 5/2015 | Li | H04L 1/0021 455/450 |
| 2019/0281644 A1* | 9/2019 | Hu | H04W 72/085 |

FOREIGN PATENT DOCUMENTS

| | | |
|---|---|---|
| WO | 2012028641 A1 | 3/2012 |
| WO | 2016078684 A1 | 5/2016 |
| WO | 2016144425 A1 | 9/2016 |

OTHER PUBLICATIONS

Liu et al., "A Threshold-Based Hybrid Relay Selection Scheme," XP031691493, pp. 1-5, Institute of Electrical and Electronics Engineers, New York, New York (2010).

"Report of email discussion [90#25][LTE/Prose] Relay UE initiation, discovery and selection/re-selection," 3GPP TSG-RAN WG2 Meeting #91, Beijing, China, R2-153764, XP050994082, pp. 1-41, 3rd Generation Partnership Project, Valbonne, France (Aug. 24-28, 2015).

"3rd Generation Partnership Project; Technical Specification Group Radio Access Network; Evolved Universal Terrestrial Radio Access (E-UTRA); Study on mobile relay(Release 12)," 3GPP TR 36.836, V12.0.0, 3rd Generation Partnership Project, Valbonne, France (Jun. 2014).

Yu et al., "Cooperative ARQ in Wireless Networks: Protocols Description and Performance Analysis," Institute of Electrical and Electronics Engineers, New York, New York (2006).

Zimmermann et al., "On the Performance of Cooperative Relaying Protocols in Wireless Networks," (2005).

Zhou et al., "A Novel Adaptive Distributed Cooperative Relaying MAC Protocol for Vehicular Networks," IEEE Journal on Selected Areas in Communications, vol. 29, No. 1, Institute of Electrical and Electronics Engineers, New York, New York (Jan. 2011).

Genc et al., "IEEE 802.16J Relay-Based Wireless Access Networks: An Overview," IEEE Wireless Communications, pp. 56-63, Institute of Electrical and Electronics Engineers, New York, New York (Oct. 2008).

Willig, "How to exploit spatial diversity in wireless industrial networks," Annual Reviews in Control 32, pp. 49-57, Elsevier Ltd. (2008).

* cited by examiner

TRANSMITTER AND RELAY COMMUNICATION DEVICES FOR D2D COMMUNICATION

CROSS-REFERENCE TO RELATED APPLICATIONS

This application is a continuation of International Application No. PCT/EP2016/079000, filed on Nov. 28, 2016, the disclosure of which is hereby incorporated by reference in its entirety.

TECHNICAL FIELD

In general, the present disclosure relates to the field of wireless D2D communications. More specifically, the present disclosure relates to a transmitter communication device for D2D communication using one or more relay communication devices as well as corresponding methods.

BACKGROUND

D2D communication between vehicles is considered as a key to improving road safety and preventing traffic congestion. The growing interest in applications of wireless technologies to vehicular environments leads to developments of technologies and protocols for data transmission between vehicles and between vehicles and road infrastructures. These emerging communication services, such as traffic safety, real-time remote monitoring, control of critical infrastructure and industrial autonomous control, raise new challenges for mobile radio wireless networks.

One of the most critical requirements for vehicular communication networks is the support of communication with low latency (less than few milliseconds) and high reliability (failure rate close to zero). The following use cases, in particular, require reliable low-latency communications for full autonomous driving functions.

By means of convoy driving vehicles in the same lane are grouped together in a stable formation with small inter-vehicle distances to increase road capacity, driver safety, and comfort. A convoy typically consists of one master, usually the leading vehicle, and multiple following vehicles. In order to maintain small inter-vehicle distances, convoy members rely on a high-frequency exchange of up-to-date and high-quality vehicle dynamic data among vehicles in the convoy. Convoy control algorithms require only the vehicle dynamics information of neighboring vehicles, instead of the information of all convoy members. As such, these algorithms scale well to large convoys and converge easily to a desired formation when vehicles join and leave the convoy.

In use cases of cooperative lane changes, cooperative vehicles (both autonomous and manually-driven) collaborate to perform lane changes of one or a group of cooperative vehicles (e.g., a convoy) in a safe and efficient manner. Unlike in a traditional lane change situation, cooperative vehicles share their planned trajectories by means of D2D communication in order to negotiate and align their maneuvers.

All of the above presented use cases, as well as autonomous driving in general, depend on an adequate and reliable perception of the vehicle surroundings in order to navigate through traffic and to ensure safety with a high level of automation (also referred to as cooperative sensing). Broken sensors, blind spots, and low level of trust in sensor data may degrade the performance or even disable automated functions of the vehicle.

The above use cases essentially require low-latency reliable D2D (device-to-device) (in the automotive context also referred to as V2V (vehicle-to-vehicle)) unicast/multicast communications. However, there are several challenges of enabling the cooperative multi-connectivity transmissions by relays. A first challenge is how to design low-latency and reliable protocols for cooperative multi-connectivity transmissions without the assistance of a cellular network (e.g., UEs in the RRC idle state or out of coverage). A second challenge is how to design low-latency and reliable protocols for cooperative multi-connectivity transmissions with a full or partial cellular network coverage. A third challenge is how to design a solution for cooperative node selections with minimized sidelink channel quality information exchange between communication devices and with consideration of future mobility of the communication devices.

A number of approaches for cooperative relay transmissions, including 3GPP relay, have been reported in the literature (3GPP TR 36.836, "Evolved Universal Terrestrial Radio Access (E-UTRA); Study on mobile relay"). For instance, an ad-hoc relay network architecture has been disclosed in IEEE ICC 2006, "Cooperative ARQ in Wireless Networks: Proctools and Performance" and in European Trans. on Telecomm 2005, "On the Performance of Cooperative Relaying Protocols in Wireless Networks," by E. Zimmermann, P. Herhold, and G. Fettweis. Enhancing relay functionality for IEEE 802.11/15.4/16j systems has been studied in IEEE JSAC 2011, "A Novel Adaptive Distributed Cooperative Relaying MAC Protocol for Vehicular Networks" and in IEEE Wireless Communications 2008, "IEEE 802.16j relay-based wireless access networks: an overview". Moreover, previous works on relays for wireless industrial communications between master node and slave nodes can be found in "How to exploit spatial diversity in wireless industrial networks", Elsevier Annual Reviews in Control, 2008.

However, none of the conventional approaches mentioned above is designed for reliable low-latency communication systems. Thus, there is still a lack of relay network architectures for $5^{th}$ Generation (5G) heterogeneous Radio Access Technologies (RATs) and enhanced relay functionalities for 5G cellular network communication systems.

In light of the above, there is still a need for an improved transmitter communication device configured to use one or more relay communication devices as well as a corresponding method, which allow providing a D2D communication network achieving both low latency and high reliability.

SUMMARY

It is an object of the disclosure to provide an improved transmitter communication device, in particular which is configured to use one or more relay communication devices as well as a corresponding method, which allow providing a D2D communication network achieving both low latency and high reliability.

The foregoing and other objects are achieved by the subject matter of the independent claims. Further implementation forms are apparent from the dependent claims, the description and the figures.

Generally, the present disclosure relates to a transmitter communication device and a method to transmit messages in a wireless D2D communication system via cooperative transmissions with neighboring devices, including a receiver communication device and a plurality of relay communication devices. More specifically, the present disclosure enables hybrid AF (Amplify and Forward) and DF (Decode and Forward) relay cooperative transmissions for enhancing the 3GPP LTE-D2D framework. Firstly, a single AF relay or multiple AF relays can be used to mainly improve SNR at short latency (no need to wait for decoding the original packet), by exploring both the proximity SNR gain or/and multipath diversity gain. Secondly, DF relays can be used to enable cooperative spatial diversity from multiple relays. It can be applied to mission-critical services requiring both high reliability and strict punctuality of packet delivery.

Embodiments of the present disclosure provide, amongst others, the following advantages: significant expansion of the coverage of reliable low-latency D2D communication by device cooperation, i.e. proximity Signal-to-Noise Ratio (SNR) gain and spatial diversity gain; great flexibility in trade-off between spectral efficiency and D2D coverage (low-latency reliable); great flexibility in cooperation with the cellular network assistance for better D2D relay selection and resource allocation; and great flexibility in dual-connectivity per node to provide more reliable control channel design.

More specifically, according to a first aspect the disclosure relates to a transmitter communication device for a D2D communication network with a plurality of communication devices, including one or more receiver communication devices and a plurality of relay communication devices. The transmitter communication device comprises: a processor configured to select a subset of the plurality of relay communication devices for relaying a communication message to the one or more receiver communication devices and to configure the subset of relay communication devices to relay the communication message using one of a plurality of relay modes, including a first relay mode and a second relay mode, wherein the first relay mode is an "amplify and forward" relay mode and wherein the second relay mode is a "decode and forward" relay mode; and a communication interface configured to transmit the communication message to the one or more receiver communication devices via the subset of relay communication devices.

Thus, an improved transmitter communication device is provided configured to use one or more relay communication devices, which allows providing a D2D communication network achieving both low latency and high reliability.

In a first possible implementation form of the transmitter communication device according to the first aspect, the processor is further configured to estimate a quality measure, in particular a signal-to-noise ratio or a packet reception probability, of a D2D communication channel between the transmitter communication device and the receiver communication device and to transmit the communication message without the relay communication devices to the receiver communication device, in case the estimated quality measure is larger than a quality measure threshold.

In a second possible implementation form of the transmitter communication device according to the first aspect or the first implementation form thereof, the processor is further configured to select the subset of relay communication devices on the basis of a respective quality measure, in particular a signal-to-noise ratio, associated with each relay communication device, wherein the respective quality measure is based on the quality of a D2D communication channel between the transmitter communication device and the respective relay communication device and on the quality of a D2D communication channel between the respective relay communication device and the receiver communication device. In an implementation form the signal-to-noise ratio associated with a relay communication device can be the corresponding signal-to-noise ratio at the receiver communication device.

In a third possible implementation form of the transmitter communication device according to the second implementation form of the first aspect, the processor is configured to select the subset of relay communication devices by selecting the relay communication device(s), for which the associated signal-to-noise ratio leads to an estimate of the block error rate based on the Polyanskiy bound or a variant thereof that is smaller than a block error rate threshold.

In a fourth possible implementation form of the transmitter communication device according to the first aspect or the first implementation form thereof, the processor is configured to select the subset of relay communication devices on the basis of information about the position and/or the velocity of each relay communication device by predicting for each relay communication device a first channel quality along a D2D communication channel between the transmitter communication device and the relay communication device and a second channel quality along a D2D communication channel between the relay communication device and the receiver communication device. In an implementation form the first channel quality and the second channel quality can be a path loss along the respective D2D communication channels.

In a fifth possible implementation form of the transmitter communication device according to the fourth implementation form of the first aspect, the processor implements a Kalman filter, wherein the Kalman filter is configured to predict for each relay communication device the first channel quality and the second channel quality on the basis of a mobility model and/or a path loss model.

In a sixth possible implementation form of the transmitter communication device according to the fourth or fifth implementation form of the first aspect, the processor is configured to extract the information about the position and/or the velocity of each relay communication device from one or more CAM messages (Cooperative Awareness Messages) received via the communication interface from the plurality of communication devices.

In a seventh possible implementation form of the transmitter communication device according to the first aspect or any one of the first to sixth implementation form thereof, for configuring the subset of relay communication devices the processor is configured to transmit via the communication interface a first control message for informing the subset of relay communication devices to relay the communication message using the first relay mode.

In an eighth possible implementation form of the transmitter communication device according to the seventh implementation form of the first aspect, the first control message further comprises information for identifying one or more communication resource blocks for transmitting the communication message, information about a signal power for relaying the communication message using the first relay mode and/or an expiration timer.

In a ninth possible implementation form of the transmitter communication device according to the seventh or eighth implementation form of the first aspect, after transmitting the first control message and in response to receiving information that the receiver communication device was not able to decode the communication message, the processor is configured to re-configure the subset of relay communication devices to transmit via the communication interface a second control message for informing the subset of relay communication devices to relay the communication message using the second relay mode.

In a tenth possible implementation form of the transmitter communication device according to the ninth implementation form of the first aspect, the second control message further comprises information for identifying one or more communication resource blocks for transmitting the communication message, information about a signal power for relaying the communication message using the second relay mode and/or an expiration timer.

In an eleventh possible implementation form of the transmitter communication device according to the ninth or tenth implementation form of the first aspect, the processor is configured to re-configure the subset of relay communication devices by defining pairs of relay communication devices of the subset of relay communication devices, wherein the pairs of relay communication devices are configured to relay the communication message using the second relay mode on the basis of the Alamouti precoding technique or a variant thereof.

In a twelfth possible implementation form of the transmitter communication device according to the eleventh implementation form of the first aspect, the second control message further comprises information about an assignment of each relay communication devices to a pair of relay communication devices.

In a thirteenth possible implementation form of the transmitter communication device according to the first aspect or any one of the first to twelfth implementation form thereof, the plurality of relay modes comprise a third relay mode, wherein the processor is configured to configure the subset of relay communication devices to relay the communication message using the first relay mode, the second relay mode or the third relay mode, wherein the third relay mode comprises a time domain equalization and forwarding of the communication message.

According to a second aspect the disclosure relates to a corresponding method of operating a transmitter communication device for a D2D communication network with a plurality of communication devices, including one or more receiver communication devices and a plurality of relay communication devices. The method comprises the following steps: selecting a subset of the plurality of relay communication devices for relaying a communication message to the receiver communication device; configuring the subset of relay communication devices to relay the communication message using one of a plurality of relay modes, including a first relay mode and a second relay mode, wherein the first relay mode is an "amplify and forward" relay mode and wherein the second relay mode is a "decode and forward" relay mode; and transmitting the communication message to the one or more receiver communication devices via the subset of the plurality of relay communication devices.

The method according to the second aspect of the disclosure can be performed by the transmitter communication device according to the first aspect of the disclosure. Further features of the method according to the second aspect of the disclosure result directly from the functionality of the transmitter communication device according to the first aspect of the disclosure and its different implementation forms.

According to a third aspect the disclosure relates to a computer program comprising program code for performing the method of the second aspect when executed on a computer.

The disclosure can be implemented in hardware and/or software.

BRIEF DESCRIPTION OF THE DRAWINGS

Further embodiments of the disclosure will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present disclosure may be placed. It will be appreciated that other aspects may be utilized and structural or logical changes may be made without departing from the scope of the present disclosure. The following detailed description, therefore, is not to be taken in a limiting sense, as the scope of the present disclosure is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims embodiments with different functional blocks or processing units are described, which are connected with each other or exchange signals. It will be appreciated that the present disclosure covers embodiments as well, which include additional functional blocks or processing units that are arranged between the functional blocks or processing units of the embodiments described below.

Finally, it is understood that the features of the various exemplary aspects described herein may be combined with each other, unless specifically noted otherwise.

Spatial diversity is an appealing physical enabler for achieving high reliability and low latency at the same time. Cooperative relaying transmission is one way to implement spatial diversity by exploring neighboring nodes cooperation, e.g., distributed virtual Multiple-Input and Multiple-Output (MIMO). Embodiments of the disclosure focus on cooperative transmissions that explore the multi-node spatial diversity. Cooperative multi-connectivity transmissions have the following advantages: a significant expansion of the coverage of reliable low-latency D2D communication by device cooperation, i.e., proximity Signal-to-noise ratio (SNR) gain and spatial diversity gain; and a great flexibility in trade-off between spectral efficiency and PC5 coverage (low-latency & reliable).

Figure 1:
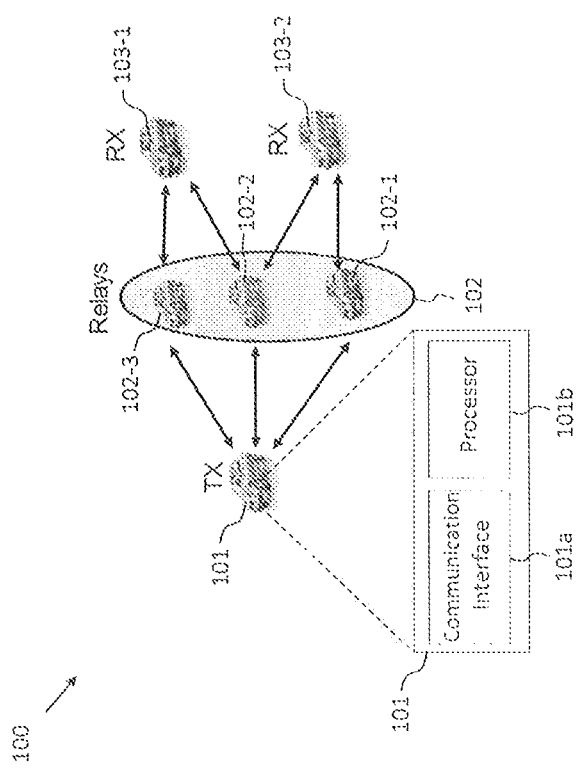
FIG. 1 shows a schematic diagram of a D2D communication network comprising a transmitter communication device, a plurality of relay communication devices and a plurality of receiver communication devices according to an embodiment.

Embodiments of the disclosure can be implemented in the D2D communication network 100 shown in FIG. 1, comprising a transmitter communication device 101, a plurality of relay communication devices (which are collectively referred to with the reference sign 102 and individually with the reference signs 102-1, 102-2 and so forth), and a plurality of receiver communication devices 103-1, 103-2. The transmitter communication device 101 is configured for D2D communication with the plurality of relay communication devices 102, and the plurality of receiver communication devices 103-1, 103-2. In the exemplary D2D communication network 100 shown in FIG. 1, the plurality of communication devices are implemented as vehicles, such as cars, having a D2D communication unit.

As can be taken from the detailed view of the transmitter communication device 101 shown in FIG. 1, the transmitter communication device 101 comprises a communication interface 101a and a processor 101b.

The processor 101b of the transmitter communication device 101 is configured to select a subset of the plurality of relay communication devices 102 for relaying a communication message to the one or more receiver communication devices 103-1, 103-2 and to configure the subset of relay communication devices 102 to relay the communication message using one of a plurality of relay modes, including a first relay mode and a second relay mode, wherein the first relay mode is an "amplify and forward (AF)" relay mode and wherein the second relay mode is a "decode and forward (DF)" relay mode, as will be described in more detail further below. In the following, a relay communication device 102 operating in the AF relay mode will also be referred to as AF relay and a relay communication device 102 operating in the DF relay mode will also be referred to as DF relay.

The communication interface 101a of the transmitter communication device 101 is configured to transmit the communication message to the one or more receiver communication devices 103-1, 103-2 via the subset of relay communication devices.

The number of the known receiver communication devices 103 can be one or multiple receiver communication devices 103, i.e., unicast or multicast transmissions. Normally, the unicast or multicast destination MAC addresses are known in advance, e.g., from application layer information exchange among nodes.

In an embodiment, the AF relay is effective when the received Signal-Noise-Ratio (SNR) between the transmitter communication device 101 and relay communication devices 102 are high; the amplification of the desired signal can be useful to overcome large path loss and noise from the relay communication devices 102 towards the receiver communication devices 103. On the other hand, the DF relay decodes and re-encodes the received signal, and then forwards it to the transmission. The DF relay does not cause noise amplification.

Embodiments of the disclosure provide signaling and algorithms that enable hybrid AF and DF relay cooperative transmissions for enhancing the 3GPP LTE-D2D framework. A single or multiple AF relays are used to mainly improve SNR at short latency (no need to wait for decoding the original packet), by exploring both the proximity SNR gain and/or multipath diversity gain. It is to be understood that the gain from multiple AF relays in terms of SNR generally cannot be computed in a closed-form formula, due to the uncertainty of either destructive or constructive superposition of multiple received signals at the receiver communication device 103 from multiple AF relays (small-scale fading). Yet, there is a clear gain of SNR in the large-scale fading. The DF relay can also be used to enable cooperative spatial diversity from multiple relays.

Figure 2:
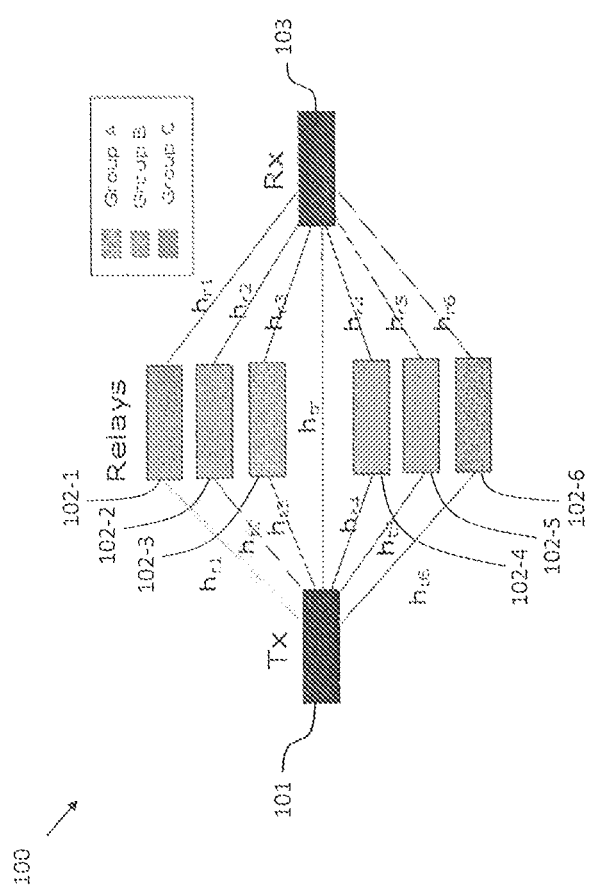
FIG. 2 shows a schematic diagram of a D2D communication network comprising a transmitter communication device, a plurality of relay communication devices classified into three different groups and a receiver communication device according to an embodiment.

FIG. 2 shows a scheme of cooperative multi-connectivity transmissions according to embodiments of the disclosure, wherein the relay communication devices 102 are classified into 3 groups according to the transmission stage in which they participate.

As shown in FIG. 2, the relay communication devices 102 in close proximity to the transmitter communication device 101 towards a given receiver communication device 103 can be grouped into the following 3 categories: Group A comprising the relay communication devices 102-3 and 102-4 taking part in the first transmission; Group B comprising the relay communication devices 102-2 and 102-5 taking part in a re-transmission or second transmission together with group A; and Group C comprising the relay communication devices 102-1 and 102-6, which do not take part in current transmissions, but which constitute potential relays for future communication messages due to their geographical proximity. Groups A, B, and C can also comprise the receiver communication devices 103.

Figure 3A:
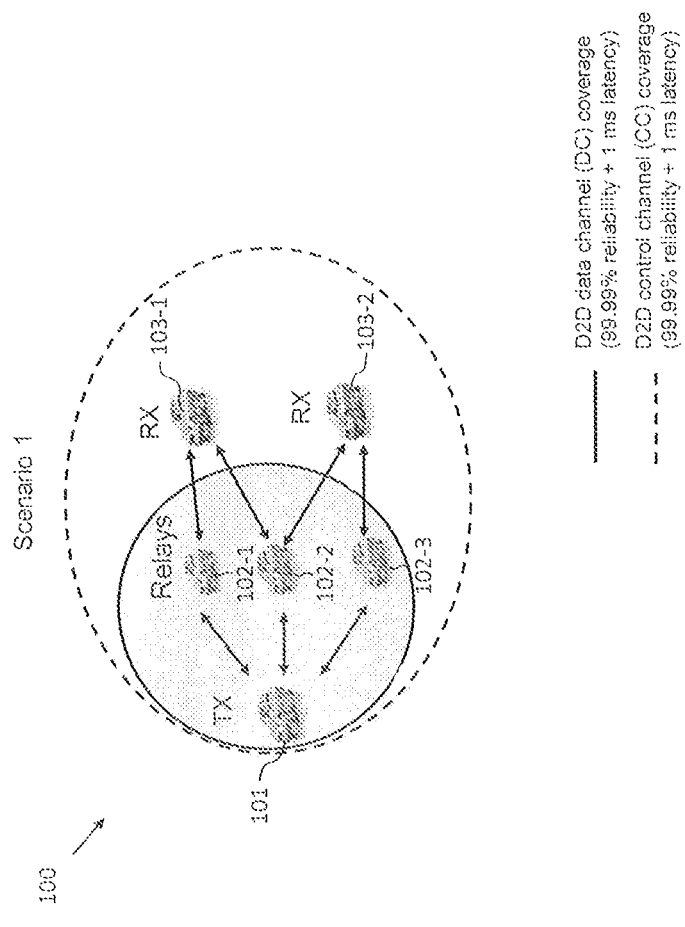
FIGS. 3A, 3B, and 3C show schematic diagrams of a D2D communication network comprising a transmitter communication device, a plurality of relay communication devices and a plurality of receiver communication devices according to an embodiment in three different scenarios.

FIG. 3A shows a schematic diagram of the D2D communication network 100 including the transmitter communication device 101, the plurality of relay communication devices 102 and the plurality of receiver communication devices 103-1, 103-2 for cooperative multi-connectivity according to an embodiment in a first communication scenario.

In the first scenario shown in FIG. 3A, the transmitter communication device 101, the relay communication devices 102, and the receiver communication devices 103-1, 103-2 are all in the common D2D control channel (CC) coverage. On the other hand, the transmitter communication device 101 and the relay communication devices 102 are in the common data channel (DC) coverage, but the receiver communication devices 103-1, 103-2 are not in the common data channel coverage.

According to embodiments of the disclosure, the coverage can be specifically defined to reach a packet delivery ratio of nearly 99.99% at 1 ms deadline. Thus, it is not the radio coverage for successfully decoding a normal data packet in LTE system.

Figure 3B:
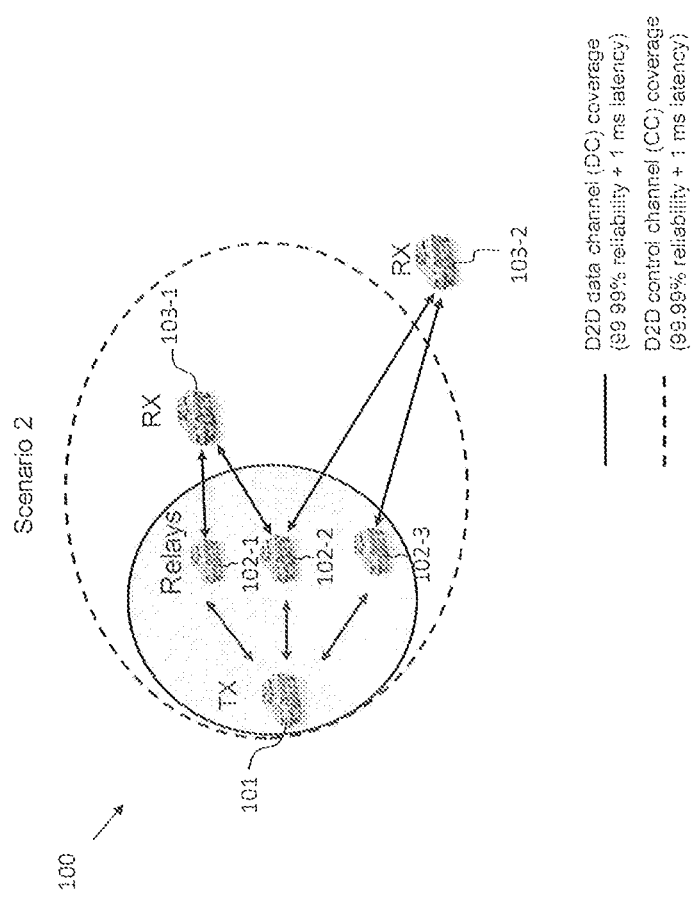

FIG. 3B shows a schematic diagram of the D2D communication network 100 comprising the transmitter communication device 101, the plurality of relay communication devices 102, and the plurality of receiver communication devices 103-1, 103-2 for cooperative multi-connectivity according to an embodiment in a second communication scenario.

As in the first scenario, the transmitter communication device 101 and the relay communication devices 102 are in the common data channel coverage, but the receiver communication devices 103-1, 103-2 are not in the common data channel coverage. Different from the first scenario, the second scenario includes a subset of the plurality of the receiver communication devices 103-1, 103-2 out of the common control channel coverage.

Figure 3C:
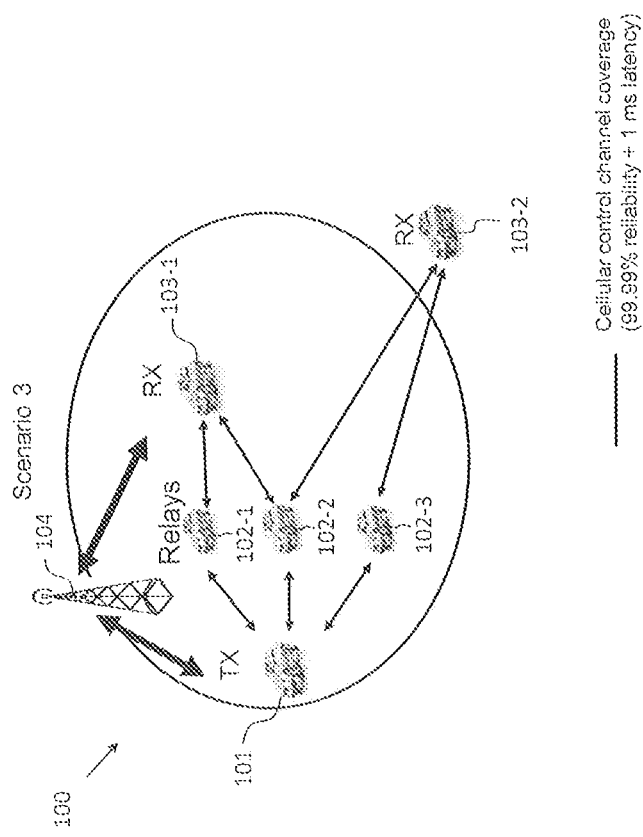

FIG. 3C shows a schematic diagram of the D2D communication network 100 comprising the transmitter communication device 101, the plurality of relay communication devices 102, the plurality of receiver communication devices 103-1, 103-2, and a base station 104 for cooperative multi-connectivity according to an embodiment in a third communication scenario.

In the third scenario, the radio network is configured in a dual-connectivity control (C)/user (U) plane split way. The control of V2V communications is conducted at a Uu interface and a PC5 interface. Via the Uu interface, the base station 104 can take over the control of cooperative multi-connectivity transmission, which is completely transparent to the transmitter communication device 101 and the receiver communication devices 103. In some cases, the base station 104 can also join the cooperative multi-connectivity transmissions to relay the data transmission from the transmitter communication device 101 to the receiver communication devices 103-1, 103-2.

Figure 4A:
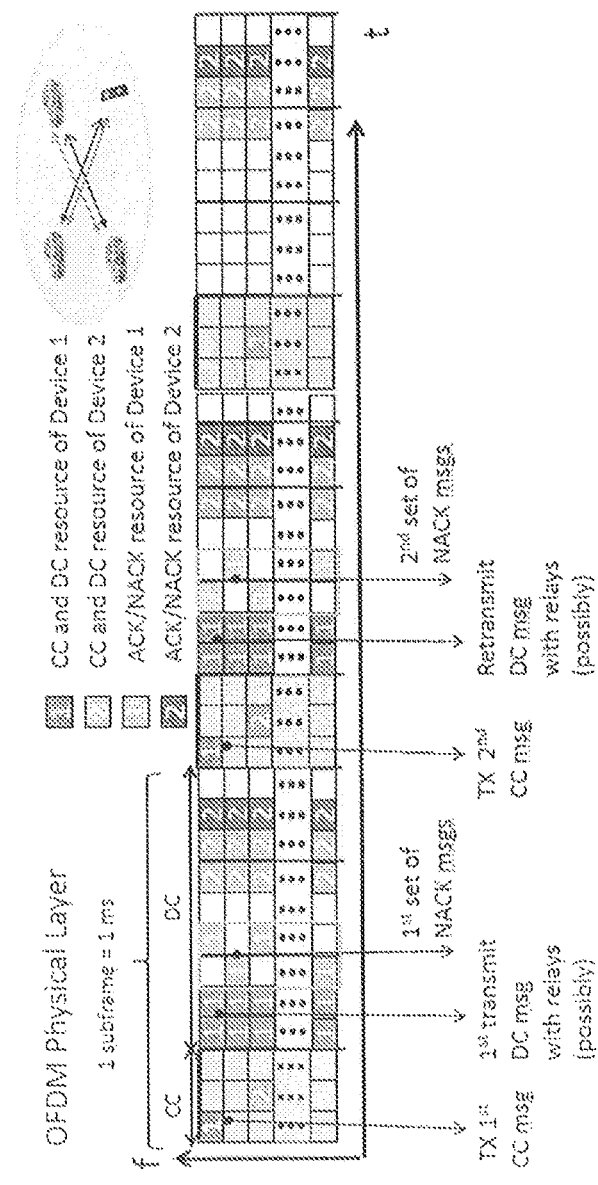
FIG. 4A shows a schematic diagram of a communication resource pool design as used by a transmitter communication device according to an embodiment.
Figure 4B:
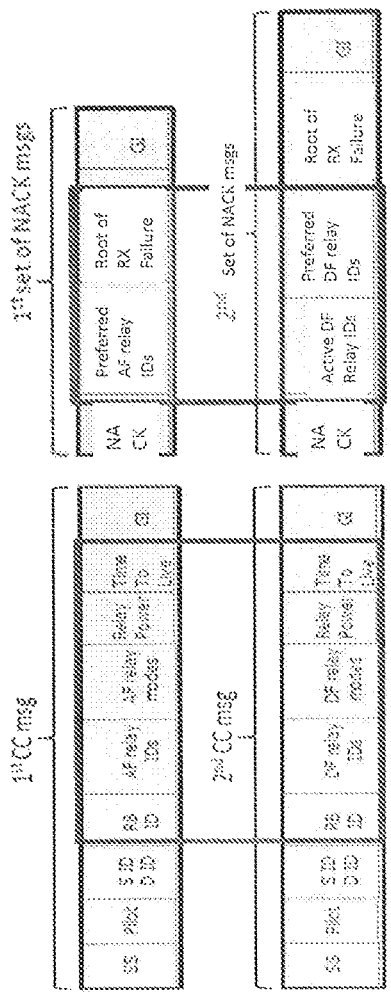
FIG. 4B shows a schematic diagram of the respective configuration of a first and second control message as well as negative acknowledgement messages as used by a transmitter communication device, a relay communication device and a receiver communication device according to an embodiment.

FIG. 4A shows a schematic diagram of a communication resource pool design as used by the transmitter communication device 101 according to an embodiment. FIG. 4B shows a schematic diagram of the respective configuration of a first and second control message as well as negative acknowledgement messages as used by the transmitter communication device 101, the relay communication devices 102 and the receiver communication devices 103-1, 103-2 according to an embodiment.

The pool of communication resources (e.g. time and frequency resources) shown in FIG. 4A is further divided into a control channel (CC) pool and a data channel (DC) pool in the time domain. Within the CC pool, the transmitter communication device 101 can select one or more resource blocks to exchange control information including cooperating node configuration information. Within the DC pool, the transmitter communication device 101 can select resource blocks for data transmissions and their respective ACKs/NACKs.

As shown in FIG. 4A, within the $1^{st}$ sub-frame of 1 ms, the transmitter communication device 101 transmits a first CC message in the CC pool to configure the cooperative transmission and a first DC message in the DC pool with potential cooperative transmissions from the AF relays 102, followed by the $1^{st}$ set of multiple NACKs from failed receipts. Then, the transmitter communication device 101 starts the $2^{nd}$ CC message, wherein the $2^{nd}$ DC message can be transmitted by one or multiple DF relays 102 configured by the transmitter communication device 101, followed by the $2^{nd}$ set of multiple NACKs from failed receipts. FIG. 4A only illustrates two transmissions, but in general the same procedures can apply to more than two transmissions.

As shown in FIG. 4B, the content of the CC message and the NACK message that are required for cooperative transmissions are marked with a rectangle. These messages are exchanged among the transmitter communication device 101, the relay communication devices 102 and the receiver communication devices 103, which are used in the signaling framework described in more detail further below. As can be taken from FIG. 4B, in an embodiment the CC message and the NACK message can comprise the following fields/content.

AF relay IDs: a set of node IDs selected by the transmitter (TX) communication device 101 to operate in the amplify forward (AF) relay mode.

DF relay IDs: a set of node IDs selected by the transmitter (TX) communication device 101 to operate in the decode forward (DF) relay mode.

RB ID: frequency-time resource block ID selected by the transmitter (TX) communication device 101 for relay transmissions.

AF/DF relay modes identifiers.

Relay power: specifying the transmission power of each relay node 102, e.g., the transmission power of the AF relay can be different depending on how far it is from the node of the relay communication devices 102 to the node of the receiver communication device 103. For different locations of the receiver communication device 103, the transmission power of the relay 102 can be set differently.

Active AF relay IDs: the receiver communication device 103 informs the transmitter communication device 101 about a set of active nodes of the relay communication devices 102 that perform the last cooperative transmissions. This set of the active relay communication devices 102 acts as "ACK" to the set of the relay communication devices 102 originally selected by the transmitter communication device 101, such that inactive relay communication devices 102 will be excluded in the next set of selected relay communication devices 102.

Preferred DF relay IDs: the receiver communication device 103 informs the transmitter communication device 101 about a set of its preferred relay communication devices 102 based on its direct measurement of the channel quality information (CQI). In this way, the transmitter communication device 101 can improve the relay selection in the next round.

Time to Live: remaining time to live before the packet delivery deadline.

Root of RX failure: If a reception failure is due to collision or interference (not SNR), the receiver communication device 103 informs the transmitter communication device 101 to re-select a resource block.

Figure 5:
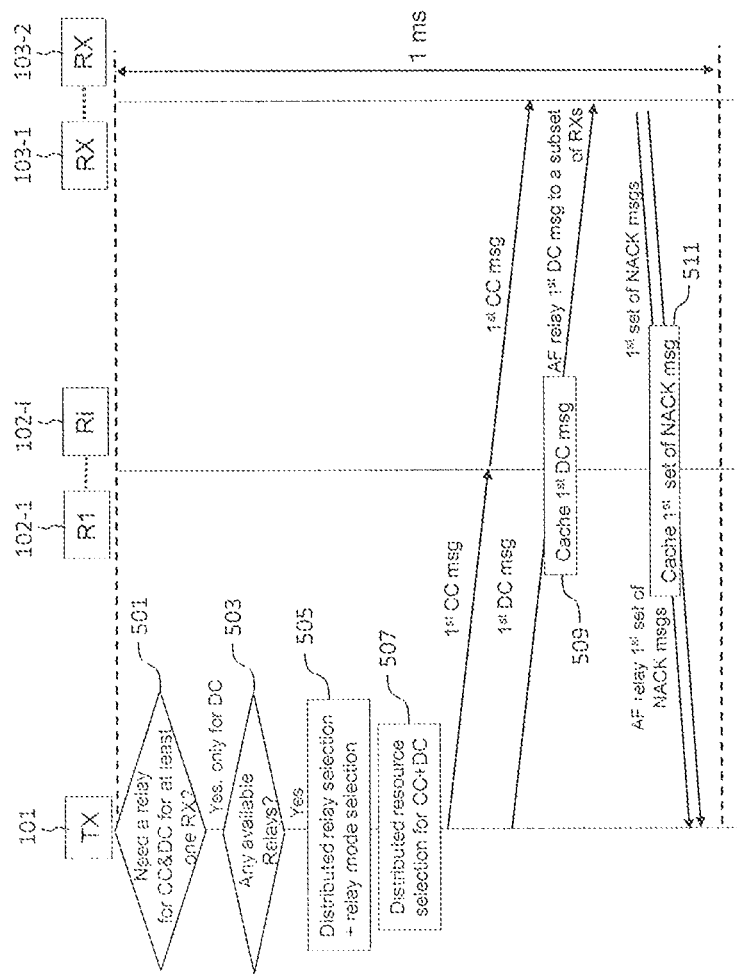
FIG. 5 shows a diagram illustrating a procedure for exchanging control and data messages between a transmitter communication device, a plurality of relay communication devices and a plurality of receiver communication devices during a first stage of a first communication scenario according to an embodiment.

FIG. 5 illustrates an embodiment of exchanging control and data messages during the first transmission in the first communication scenario, wherein the transmitter communication device 101, the relay communication devices 102, and the receiver communication devices 103-1, 103-2 are all in the common D2D control channel coverage, and wherein the transmitter communication device 101 and the relay communication devices 102 are in the common data channel coverage, but the receiver communication devices 103-1, 103-2 are not. The procedure shown in FIG. 5 comprises the following steps.

The transmitter communication device 101 decides if a relay transmission is needed for CC and DC for at least one receiver communication device 103 (step 501).

If a relay is needed only for DC, the transmitter communication device 101 evaluates if any relay communication device 102 is available (step 503).

If the relay communication device 102 is available, the transmitter communication device 101 performs a selection of distributed relay communication devices 102 and a selection of the relay modes (step 505).

The transmitter communication device 101 performs a selection of distributed resources for CC and DC (step 507).

The transmitter communication device 101 sends a first CC message to the relay communication devices 102, and the relay communication devices 102 send the first CC message to the receiver communication devices 103.

The transmitter communication device 101 sends a first DC message to the relay communication devices 102, and the relay communication devices 102 send the first DC message of the AF relay to a subset of the receiver communication devices 103. The first DC message can be cached by the relay communication devices 102 (step 509).

The receiver communication device 103 sends a first set of NACK messages with respect to the AF relay to the transmitter communication device 101. The first set of NACK messages can be cached by the relay communication devices 102 (step 511).

Figure 6:
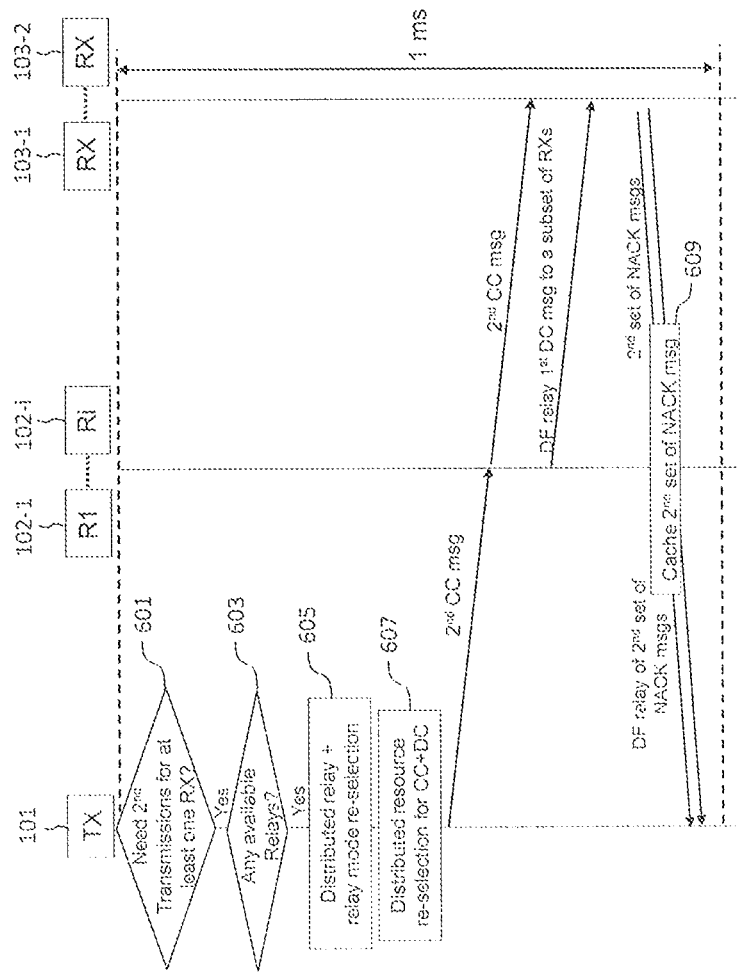
FIG. 6 shows a diagram illustrating a procedure for exchanging control and data messages between a transmitter communication device, a plurality of relay communication devices and a plurality of receiver communication devices during a second stage of a first communication scenario according to an embodiment.

In case a set of NACK(s) is sent back from the receiver communication device(s) 103, the second transmission in the first communication scenario can be triggered, as shown in FIG. 6. The procedure shown in FIG. 6 comprises the following steps:

The transmitter communication device 101 decides if a second relay transmission is needed for at least one receiver communication device 103 (step 601).

If a second relay transmission is needed, the transmitter communication device 101 evaluates if any relay communication device 102 is available (step 603).

If the relay communication device 102 is available, the transmitter communication device 101 performs a re-selection of distributed relay communication devices 102 and a re-selection of the relay modes (step 605).

The transmitter communication device 101 performs a re-selection of distributed resources for CC and DC (step 607).

The transmitter communication device 101 sends a second CC message to the relay communication devices 102, and the relay communication devices 102 send the second CC message to the receiver communication device 103.

The relay communication device 102 sends a first DC message of the DF relay to a subset of the receiver communication devices 103.

The receiver communication device 103 sends a second set of NACK messages with respect to the DF relay to the transmitter communication device 101. The second set of NACK messages can be cached by the relay communication devices 102 (step 609).

Figure 7:
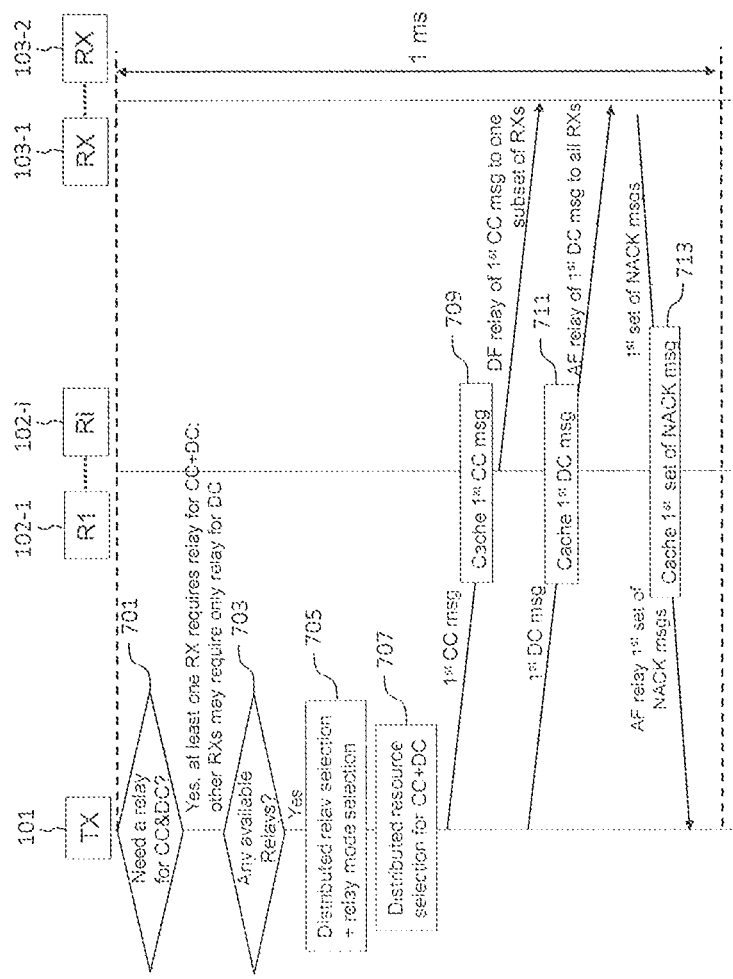
FIG. 7 shows a diagram illustrating a procedure for exchanging control and data messages between a transmitter communication device, a plurality of relay communication devices and a plurality of receiver communication devices during a first stage of a second communication scenario according to an embodiment.

FIG. 7 illustrates an embodiment of exchanging control and data messages during the first transmission in the second communication scenario, wherein one of the receiver communication devices 103-1, 103-2 is out of the range of the control channel. The procedure shown in FIG. 7 comprises the following steps according to an embodiment.

The transmitter communication device 101 decides if a relay transmission is needed for CC and DC for at least one receiver communication device 103 (step 701).

If at least one receiver communication device 103 is required for CC and DC, the transmitter communication device 101 evaluates if any relay communication device 102 is available (step 703).

If the relay communication device 102 is available, the transmitter communication device 101 performs a selection of distributed relay communication devices 102 and a selection of the relay modes (step 705).

The transmitter communication device 101 performs a selection of distributed resources for CC and DC (step 707).

The transmitter communication device 101 sends a first CC message to the relay communication devices 102, and the relay communication devices 102 send the first CC message for the DF relay to the receiver communication device 103. The first CC message can be cached by the relay communication devices 102 (step 709).

The transmitter communication device 101 sends a first DC message to the relay communication devices 102, and the relay communication devices 102 send the first DC message of the AF relay to a subset of the receiver communication devices 103. The first DC message can be cached by the relay communication devices 102 (step 711).

The receiver communication device 103 sends a first set of NACK messages with respect to the AF relay 102 to the transmitter communication device 101. The first set of NACK messages can be cached by the relay communication devices 102 (step 713).

Figure 8:
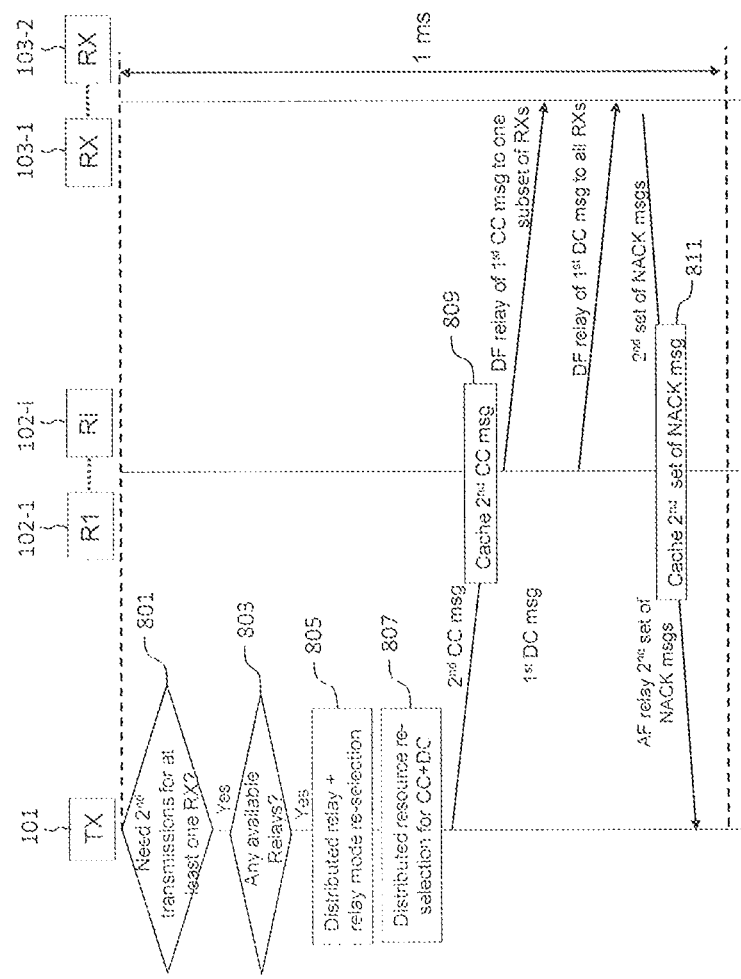
FIG. 8 shows a diagram illustrating a procedure for exchanging control and data messages between a transmitter communication device, a plurality of relay communication devices and a plurality of receiver communication devices during a second stage of a second communication scenario according to an embodiment.

In case a re-transmission is required (i.e. in case the DC message was not received), the second transmission in the second communication scenario can be triggered, as shown in FIG. 8. The procedure shown in FIG. 8 comprises the following steps according to an embodiment.

The transmitter communication device 101 decides if a second relay transmission is needed for at least one receiver communication device 103 (step 801).

If a second relay transmission is needed, the transmitter communication device 101 evaluates if any relay communication device 102 is available (step 803).

If the relay communication device 102 is available, the transmitter communication device 101 performs a re-selection of distributed relays and a re-selection of the relay modes (step 805).

The transmitter communication device 101 performs a re-selection of distributed resources for CC and DC (step 807).

The transmitter communication device 101 sends a second CC message to the relay communication devices 102, and the relay communication devices 102 send the first CC message for DF relay to a subset of the receiver communication devices 103. The second CC message can be cached by the relay communication devices 102 (step 809).

The relay communication devices 102 send the first DC message of the DF relay to all receiver communication devices 103.

The receiver communication device 103 sends a second set of NACK messages with respect to the AF relay to the transmitter communication device 101. The second set of NACK messages can be cached by the relay communication devices 102 (step 811).

In case the second CC message does not reach the relay communication devices 102, the relay communication devices 102 can set a timeout after which they will simply assume that the control channel (CC) message is lost (e.g., due to collision). All the relay communication devices 102 which have decoded the first transmission will simply retransmit the message at the same time. When all the relay communication devices 102 are assigned to retransmit the message, some SNRs can be obtained to compensate for the absence of Alamouti coding which uses only two relay communication devices 102 to retransmit the message.

Figure 9:
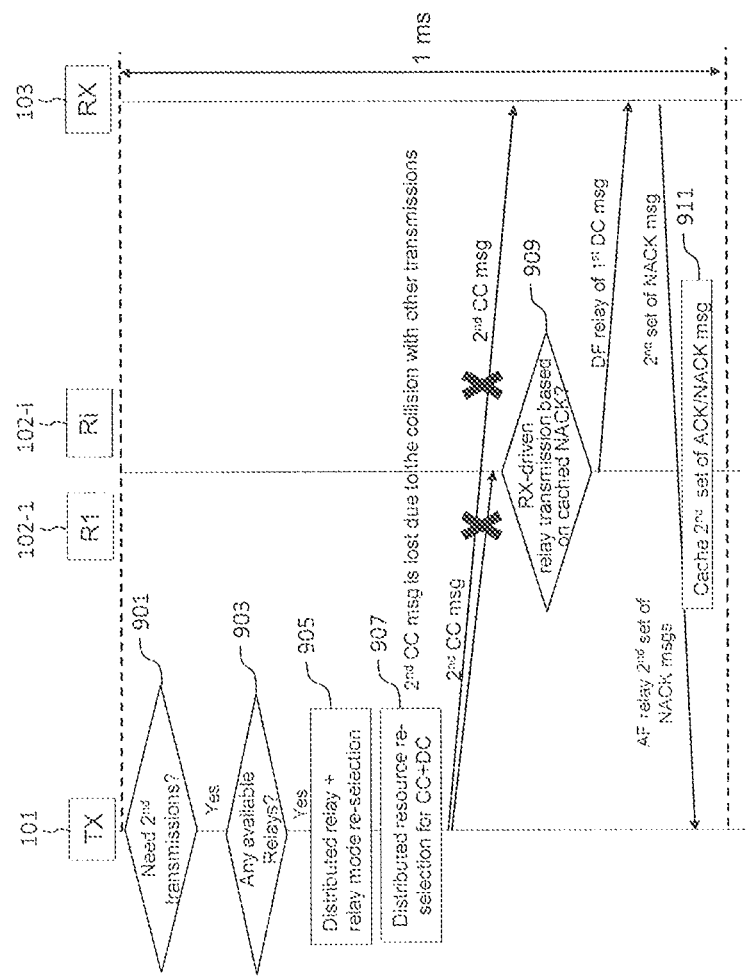
FIG. 9 shows a diagram illustrating a procedure for exchanging control and data messages between a transmitter communication device, a plurality of relay communication devices and a plurality of receiver communication devices in case of a lost control message according to an embodiment.

The signaling procedure in case of a CC message lost is shown in FIG. 9. The procedure shown in FIG. 9 comprises the following steps.

The transmitter communication device 101 decides if a second relay transmission is needed (step 901).

If a second relay transmission is needed, the transmitter communication device 101 evaluates if any relay communication device 102 is available (step 903).

If the relay communication device 102 is available, the transmitter communication device 101 performs a re-selection of distributed relays and a re-selection of the relay modes (step 905).

The transmitter communication device 101 performs a re-selection of distributed resources for CC and DC (step 907).

The second CC message is lost due to the collision with other transmissions.

The relay communication devices 102 evaluate if a receiver-driven relay transmission based on cached NACK is necessary (step 909).

The relay communication devices 102 send a first DC message of the DF relay to the receiver communication device 103.

The receiver communication device 103 sends a second set of NACK messages with respect to the AF relay to the transmitter communication device 101. The second set of NACK messages can be cached by the relay communication devices 102 (step 911).

Figure 10:
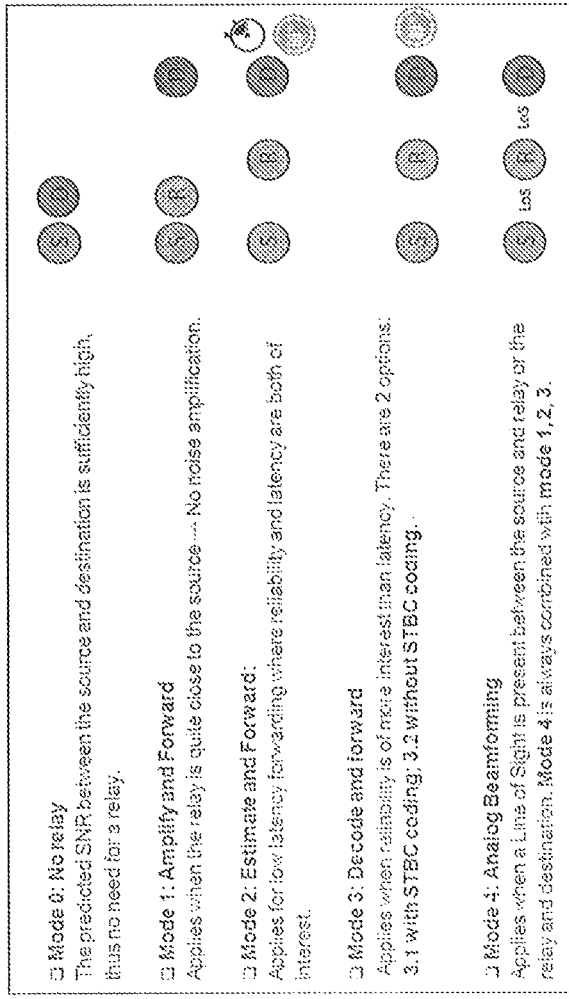
FIG. 10 shows a diagram illustrating five different relay modes of a relay communication device according to an embodiment.

FIG. 10 illustrates five different types of relay configurations according to embodiments of the disclosure. The transmitter communication device 101 can configure the following five relay modes in order to achieve high reliability and low latency at the same time within a communication network including D2D communication:

Mode 0 (No relay): The predicted SNR between the source and destination is sufficient high, thus there is no need for a relay.

Mode 1 (Amplify and Forward): the AF relay simply amplifies the source signal and re-transmits. As a drawback the noise will also be amplified in the meantime. Thus, it can apply when the relay is quite close to the source, so that there is low noise amplification.

Mode 2 (Estimate and Forward): It can apply for low latency forwarding wherein reliability and latency are both of interest. To improve the SNR of the AF relay, a time equalization approach can be used, wherein a fast time domain equalization procedure is undertaken, wherein an inverse of the frequency response is transformed into the time domain. Once an inverse time domain frequency response is obtained, the relays 102 operating in this mode can convolve the baseband data signal using the inverse channel filter, "cleaning" up the signal before forwarding.

Mode 3 (Decode and Forward): the DF relay decodes the source transmission, re-encodes and re-transmits. Advantageously, noise amplification is not an issue. Thus, it can be used when reliability is more important than latency. There are 2 options for the DF relay mode: with or without STBC (Spatial Time Block Coding), as will be described in more detail further below.

Mode 4 (Analog beamforming): It can be used when the source is within the line of sight of the relay communication devices 102 or the relay communication devices 102 are within the line of sight of the destination. The transmitter communication device 101 will choose the relay communication devices 102 whose line of sight is within the transmitter communication devices 101 or the receiver communication device 103 in order to increase the signal. The analog beamforming in the second hop can be optional (for example in multicast). Mode 4 can be combined with mode 1, 2, 3.

The different relay configurations are indicated in the "relay mode" field in the CC (control channel) messages, as described above.

Figure 11:
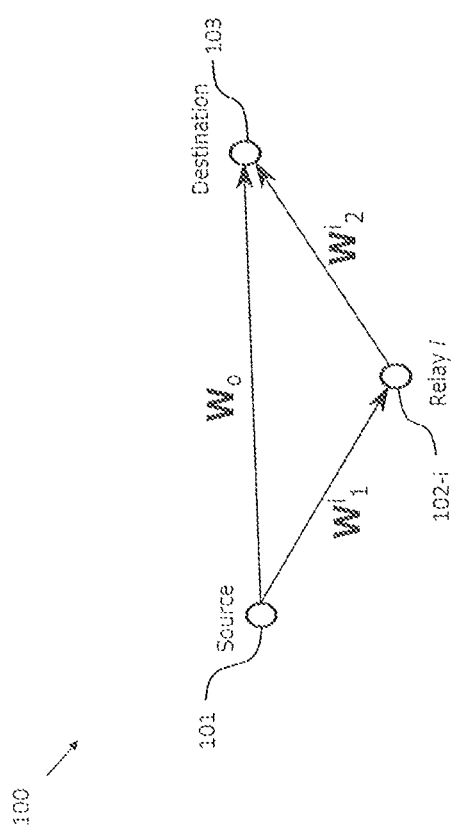
FIG. 11 shows a schematic diagram of a D2D communication network comprising a transmitter communication device, a relay communication device and a receiver communication device according to an embodiment.

According to an embodiment, FIG. 11 shows a schematic diagram of a relay setup in the D2D communication network 100, wherein a communication message needs to be delivered from the source, i.e. the transmitter communication device 101, to the destination, i.e. the receiver communication device 103, either directly through the channel $W_o$ or through the relay communication device 102-$i$ with double hop channels indicated as $W_i^1$ and $W_i^2$.

It can be shown that the average SNR through the relay communication device 102-$i$ can be estimated on the basis of the following equation:

$$\gamma_{\textit{eff}}^{\textit{relay},i} = \left(\frac{\sigma_x^2}{\sigma_{z1}^2}\right) \cdot \left(\frac{tr(R_1 R_2)}{tr(R_2) + N_d \frac{\sigma_{z2}^2}{a^2 \sigma_{z1}^2}}\right)$$

wherein $R_1$ and $R_2$ are the autocovariance matrix of the first and second hop respectively, Nd is the number of data symbols, a is the amplification factor, $\sigma_{z1}^2$ and $\sigma_{z2}^2$ are the noise powers of the first and second hops, respectively.

The SNR through each candidate relay communication device 102 to each receiver communication device 103 can be grouped into a vector of SNRs as $$\gamma_{\textit{eff}}^{\textit{relay}} = [\gamma_{\textit{eff}}^{\textit{relay},1}, \gamma_{\textit{eff}}^{\textit{relay},2} \ldots \gamma_{\textit{eff}}^{\textit{relay},N}].$$

In the unicast case, the elements of the vector are scalars representing the SNR from the transmitter communication device 101 to the receiver communication device 103. In the multicast case, the elements of the vector are the SNR averaged over all receiver communication devices 103.

Activating more relays increases the apparent SNR at the receiver communication device 103. However it would also increase the interference to other neighboring clusters using the same time frequency resources. Therefore, a certain maximum number of relay communication devices 102 can be selected based on their effective SNR value.

The achievable SNR at the receiver communication device 103 when the relay communication devices 102 are activated may still not be sufficient to correctly decode the transmission message. Whether the SNR is sufficient or not, can be determined by the Polyanskiy bound. The Polyanskiy bound takes the message size in bits, the available symbols for transmission, the SNR and yields the probability of error in delivering this message size.

Figure 12A:
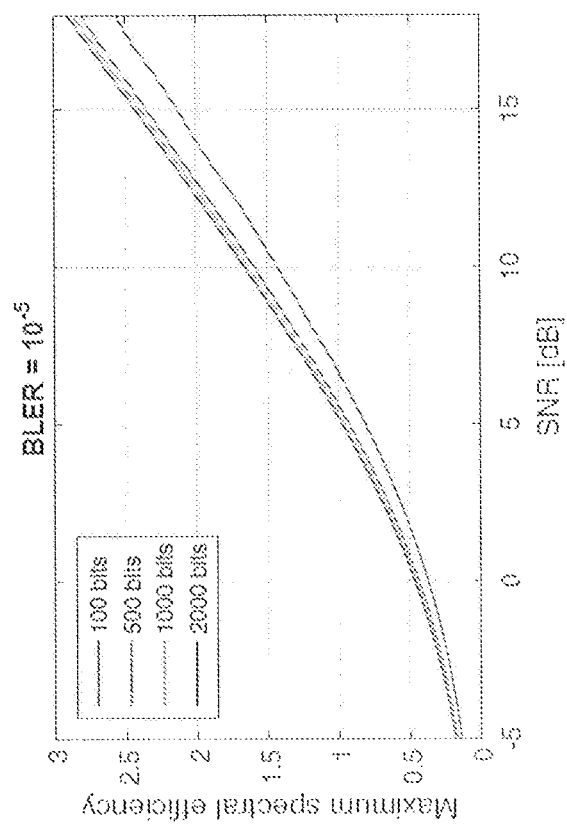
FIGS. 12A and 12B show graphs of the maximum spectral efficiency versus the signal-to-noise ratio (SNR) for different message sizes as achieved by embodiments of the disclosure.
Figure 12B:
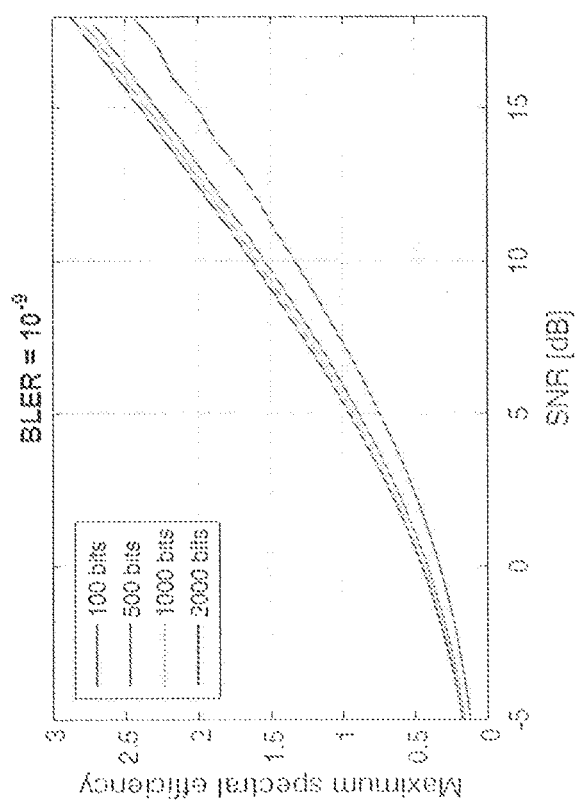

FIGS. 12A and 12B show the maximum possible spectral efficiency versus SNR for different message sizes. As an example, given that the message size is 100 bits and that the modulation and coding scheme used are fixed to a spectral efficiency of 2 bits/sec/Hz, and that the target block error rate is $10^{-5}$. As shown in FIGS. 12A and 12B, the minimum required SNR is nearly 14.2 dB. This bound assumes optimal modulation and coding with Gaussian symbol inputs. Such assumption might be generally not realistic. Hence, it is suitable to add a fixed margin on top of the computed SNR, which takes into account imperfect modulation and coding.

If the resultant SNR of the Amplify and Forward (AF) relay is not sufficient, then the transmitter communication device 101 can resort to some possible enhancements for boosting the SNR. Below two methods for enhancing the SNR are described, as implemented in embodiments of the disclosure.

Figure 13:
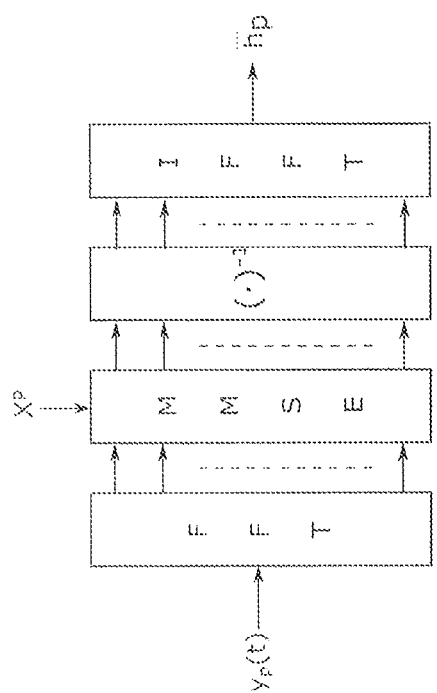
FIG. 13 shows a schematic diagram of a time equalization approach implemented in an relay communication device according to an embodiment.

AF relays simply forward the analog signal they obtain without any form of equalization. In order to improve the SNR, some sort of equalization may be introduced at the relay communication devices 102. However, due to the low latency constraints the equalization should be done within "one shot". Therefore, a time equalization approach is provided by embodiments of the disclosure, wherein the relay communication device 102 obtains an estimate of the frequency response of the channel from the preamble, then obtains an inverse of the frequency response. The inverse frequency response is transformed to the time domain. The operation of the time equalization approach is shown in FIG. 13.

Once an inverse time domain frequency response is obtained, the relay communication device 102 can convolve the baseband data signal using the inverse channel filter. In this way, the relay communication device 102 does not need to apply a FFT to the data symbols and interpolate the channel's response in the frequency domain; instead, a fast time domain equalization procedure can be undertaken. This low latency relay operation can help "cleaning-up" the signal before forwarding it.

Figure 14:
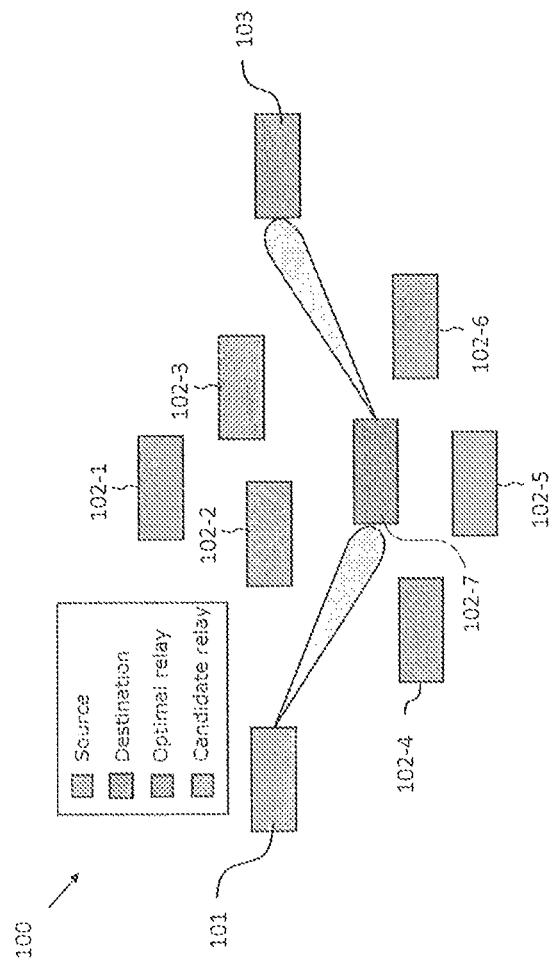
FIG. 14 shows a schematic diagram illustrating the selection of the best relay communication device within the line of sight of a receiver communication device and a transmitter communication device for analog beamforming as implemented in embodiments of the disclosure.

In V2V situations, there is a high probability that a relay communication device 102 is within the line of sight of another relay communication device 102. According to an embodiment, analog beamforming capabilities of the communication devices can be used to focus the beams on the intended receiver communication device 103 (Mode 4 relay). This is especially useful in the case of unicast transmission (in particular with a single relay communication device 102). Therefore, the transmitter communication device 101 will choose the relay communication device 102 whose line of sight is within the receiver communication device 102 and the transmitter communication device 101. The analog beamforming in the second hop is optional (for example in multicast). FIG. 14 shows an example of how a transmitter communication device 101 may pick up an optimal relay communication device 102-7 among a plurality of relay communication devices 102-1 to 102-7.

If the first transmission fails, the destination (unicast) or destinations (multicast) can send back a NACK message indicating that it has failed to decode the message. The source, i.e. the transmission device 101, now can trigger a second transmission with higher chances of decoding than the first transmission. In other words, the transmitter communication device 101 can seek a transmission strategy which increases the SNR compared to the first transmission. In this situation, the source can configure at least two relays communication devices 102 to perform a decode and forward (Mode 3 relay) transmission using Alamouti coding. The relay has relatively long time between the first transmission and the second transmission. This time can be used by the channel coding module to perform several channel decoding iterations. Being an open loop diversity scheme, Alamouti coding is suitable for this scenario since no channel knowledge is needed at the transmitter communication device 101. Ideally, for uncorrelated antennas, Alamouti offers a 3 dB increase in SNR compared to single antenna transmission.

After the arrival of the NACK, the source 101 can configure two relay communication devices 102 or one relay communication device 102 and the source itself for the second transmission. The detailed procedure of the 2nd transmission has already been described in the context of FIG. 6. The steps for the second transmission taking place at the transmitter communication device 101 are summarized in the following.

All the relay communication devices 102 taking part in the first transmission should store the message and try to decode it. However, no ACK or NACK should be sent back to the transmitter communication device 101 in order to avoid resource congestion.

The transmitter communication device 101 can query the CQI (Channel Quality Information) matrix and extract the second hop expected channel quality for all the relay communication devices 102, which already took part in the first transmission, and the destination node.

Since the relay communication devices 102 generally are not able to send back any acknowledgments, the transmitter communication device 101 needs to estimate the probability that each relay communication devices 102 successfully manages to decode the message.

The transmitter communication device 101 can also estimate the probability that the second transmission between any given relay communication device 102 and the destination 103 will be successful. This is obtained by using the CQI matrix previously computed.

The two nodes of the relay communication devices 102, which have the largest joint probability of successfully decoding the first transmission and providing a successful second transmission, can be selected for the second transmission.

The source 101 informs the two relay communication devices 102 in the MAC control channel, and assigns each relay communication device 102 an antenna role in the Alamouti coding process.

In a multicast scenario, the transmitter communication device 101 can group a pair of relay communication devices 102 for each receiver communication device 103.

Relay selection is a well-studied area in wireless communications. However, according to an embodiment, there is an ad-hoc network wherein nodes exchange CAM messages comprising their location coordinates, velocity and acceleration. The messages are exchanged periodically in a broadcast manner. Those messages can be exchanged in an 802.11p-like protocol. Some CAM message packet errors are acceptable for the functioning of the following system. According to an embodiment, CAM messages are used for a cross-layer protocol which uses the location and velocity of the neighbors to predict the best possible relay nodes for forwarding the mission critical message.

As already shown in FIG. 2, the relay communication devices 102 in close proximity to the transmitter communication device 101 towards a given receiver communication device 103 can be grouped into 3 categories: Group A comprising the relay communication devices 102-3 and 102-4 taking part in the first transmission; Group B comprising the relay communication devices 102-2 and 102-5 taking part in the re-transmission together with group A; Group C comprising the relay communication devices 102-1 and 102-6, which do not take part in current transmissions, but can be potential relays in future messages due to their geographical proximity.

The transmitter communication device 101 needs to predict the path-loss of each channel $h_x$ shown in FIG. 2. The term "channel" is used to reflect the large scale fading mainly due to path-loss, and should not be confused with small-scale fading of channel estimation. The target is that the transmitter communication device 101 will predict a CQI matrix C for the upcoming $T_p$ seconds. The matrix at time instant to can be represented as $$C_{N \times N}^{t_o} = \begin{bmatrix} 1 & V_{12}^{t_o} & \cdots & V_{1N}^{t_o} \\ V_{21}^{t_o} & 1 & \cdots & V_{2N}^{t_o} \\ \vdots & \vdots & \ddots & \vdots \\ V_{N1}^{t_o} & V_{N2}^{t_o} & \cdots & 1 \end{bmatrix}$$

wherein N is the total number of nodes in the neighborhood of the TX and $V_{ij}^{t_x}$ is the predicted pathloss between vehicle i and j at future time instant $t_x$.

Figure 15:
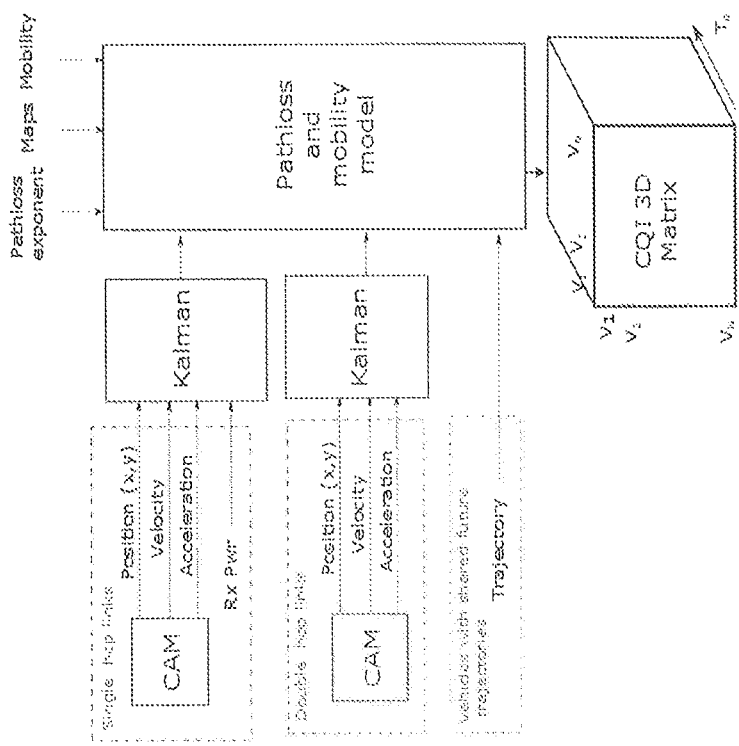
FIG. 15 shows a schematic diagram illustrating the estimation of a channel quality information (CQI) matrix on the basis of a Kalman filter as implemented in a transmitter communication device according to an embodiment.

Using matrix C, the transmitter communication device 101 has enough information to decide which relay communication devices 102 are selected for relaying when a mission-critical message is to be transmitted at a specific time instant in the future. The prediction of the path loss or the CQI can be implemented in the transmitter communication device 101 as illustrated in FIG. 15. As a first step, the transmitter communication device 101 needs to predict the positions of all the vehicles in the future. Those positions can be estimated using the following classes of information:

Single hop links: Those are the links which the transmitter communication device 101 is part of. For those links the transmitter communication device 101 uses the received power from the transmit vehicles as well as information about position, velocity and acceleration. This information is input into a Kalman filter, which predicts the location of the single hop vehicles at a certain window of time in the future. In an embodiment it is assumed that the transmission power is fixed i.e. 23 dBm.

Double hop links: Those are the links which the transmitter communication device 101 is not part of. In this case, the transmitter communication device 101 uses only the CAM message information as inputs to the Kalman filter.

Vehicles with shared trajectory exchange: Since one of the use cases is lane merging, the transmitter communication device 101 can make use of predicted trajectories which have been already shared by other vehicles previously.

As a second step, the transmitter communication device 101 can use a path loss and mobility model which is usually a characteristic of the geographical location of the network. For example, in urban environments the path-loss exponent is expected to be larger than rural environments. Additionally, the model can take into account the mobility of all the nodes in the surrounding. Nodes with large relative velocity should have lower effective SNR due to time selectivity of the channel. In addition, a map of the surrounding environment can be utilized. For example, in a cross-road the distance between two vehicles is close. However, due to the presence of a building in-between, the path loss becomes larger than of line of sight. Hence, maps can help improve the expected path loss exponents and model.

Finally, a 3D CQI matrix can be constructed which reflects the future channel qualities between all the vehicles in the vicinity of the transmitter communication device 101 for the next Tp seconds. Note that the time resolution of the prediction can depend on the periodicity of the CAM messages and possibly the trajectory exchange.

In order to minimize signaling overhead, the transmitter communication device 101 can "guess" which relay communication devices 102 have successfully decoded the first message and configure those relay communication devices 102 to perform a joint second transmission. The configuration procedure can be based on the so called Polyanskiy bound which already has been mentioned above. For each relay, the probability that a relay communication device 102-i fails to decode the first message and fails to deliver the second message can be estimated by the following equation:

$$P^i = Q\left(\frac{nC(\gamma_1^i) - k}{\sqrt{nV(\gamma_1^i)}}\right) \cdot Q\left(\frac{nC(\gamma_2^i) - k}{\sqrt{nV(\gamma_2^i)}}\right)$$

wherein $Q(\bullet)$ denotes the q-function, $\gamma_1^i$ and $\gamma_2^i$ denote the SNR of the first and second hop respectively, n is the blocklength size, k is the information message size, $C(\bullet)$ and $V(\bullet)$ are the Shannon capacity and the channel dispersion which are defined as $$C(\gamma) = \frac{1}{2}\log_2(1 + \gamma),$$

-continued $$V(\gamma) = \frac{\gamma}{2} \frac{\gamma+2}{(\gamma+1)^2} \log_2^2(e).$$

As a special case, the source 101 can estimate its own direct link block error probability, which is defined as $$P^o = Q\left(\frac{nC(\gamma_o^i) - k}{\sqrt{nV(\gamma_o^i)}}\right)$$

Finally, the relay selection process can be mathematically represented as $$\underset{i}{\mathrm{argmin}}\left\{Q\left(\frac{nC(\gamma_1^i) - k}{\sqrt{nV(\gamma_1^i)}}\right)^\alpha \cdot Q\left(\frac{nC(\gamma_2^i) - k}{\sqrt{nV(\gamma_2^i)}}\right)\right\}$$
where $i \in \{0, 1, 2, \ldots, N\}$ wherein α is an exponent highlighting the importance of decoding the first transmission, and N is the total number of relay communication devices 102 taking part in the first transmission.

As mentioned before, the Alamouti technique is an open loop precoding technique which needs minimal interaction between transmitting antennas. The Alamouti technique uses exactly two antennas which are one antenna per relay vehicle according to embodiments of the disclosure. Without going into mathematical details of Alamouti precoding, each antenna performs a certain "role" in the pre-coding procedure. Each antenna is assigned a role A or a role B. The transmitter communication device 101 can pick up two relays according to the criteria explained above and assign each relay communication device 102 a role, either A or B.

In unicast, the operation is straightforward. The transmitter communication device 101 configures the best two relay communication devices 102 to the single receiver communication device 103 and assigns each one of them a role, either "A" or "B". However, in multicast the situation is different. A pair of relay communication devices 102 is assigned to each receiver communication device 103. Although using one pair of relay communication devices 102 for all receiver communication devices 103 is manageable, the achievable SNR for all receiver communication devices 103 may not be sufficient if the receiver communication devices 103 are distributed far away from each other. Hence pairs of relay communication devices 102 can be assigned to each receiver communication device 103.

Figure 16:
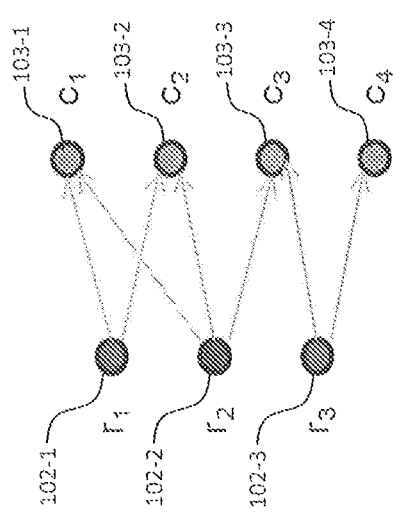
FIG. 16 shows a schematic diagram illustrating possible assignments of relay communication devices to receiver communication devices according to an embodiment.

FIG. 16 shows a possible setup of relay communication devices 102 and receiver communication devices 103. In this case, the transmitter communication device 101 configures r1 to be role A for the receiver communication devices 103-1 and 103-2 (i.e. c1 and c2), whereas r3 is configured to be r3 for receiver communication devices 103-3 and 103-4 (i.e. c3 and c4). The relay communication device r2 is a joint node which plays the role of antenna "B" for receiver communication devices 103-1, 103-2 and 103-3 (i.e. c1, c2 and c3). The receiver communication device 103-4 (i.e. c4) may be far away from r2; hence, it may only receive the signal from r3, which is still sufficient for decoding the message.

In terms of signaling, the transmitter communication device 101 can send information in the form of a matrix defining the antenna role of each relay communication device 102 to each receiver communication device 103. No relay communication device 102 should have two roles at the same time. As an example shown in FIG. 16, the matrix may be constructed in the following way:

$$\begin{bmatrix} A & B & 0 \\ A & B & 0 \\ 0 & B & 1 \\ 0 & 0 & A \end{bmatrix}$$

wherein the column indicates relay ID and the row indicates the receiver ID.

Figure 17:
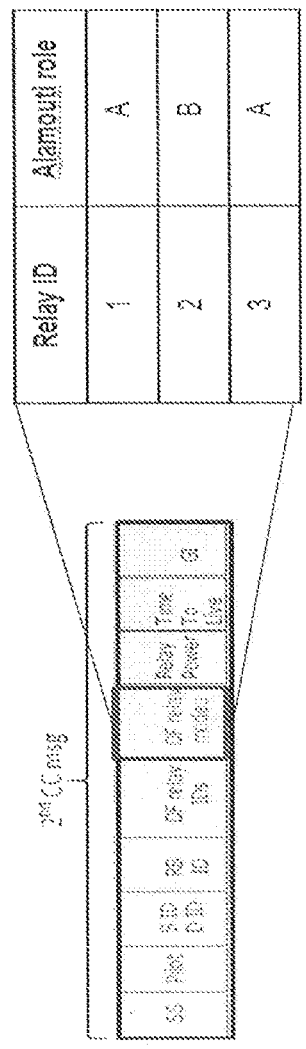
FIG. 17 shows a schematic diagram illustrating a control message and an assignment of relay communication devices to different Alamouti roles according to an embodiment.

FIG. 17 shows a schematic diagram illustrating a control message and an assignment of relay communication devices 102 to different Alamouti roles according to an embodiment. The transmitter communication device 101 selects two relay communication devices 102 according to the Polyanskiy bound and assigns each relay communication device 102 a role, either A or B. Each receiver communication device 103 will obtain a relay communication device 102 as the role A and another relay communication device 102 as the role B according to the distances/conditions between the relay communication devices 102 and the receiver communication device 103. A relay communication device 102 might be assigned to different receiver communication devices 103. To decide the role of relay communication devices 102 and to assign relay communication devices 102 to the receiver communication devices 103, the transmitter communication device 101 sends information in the form of a matrix defining the role of each relay communication device 102 to each receiver communication device 103.

Figure 18:
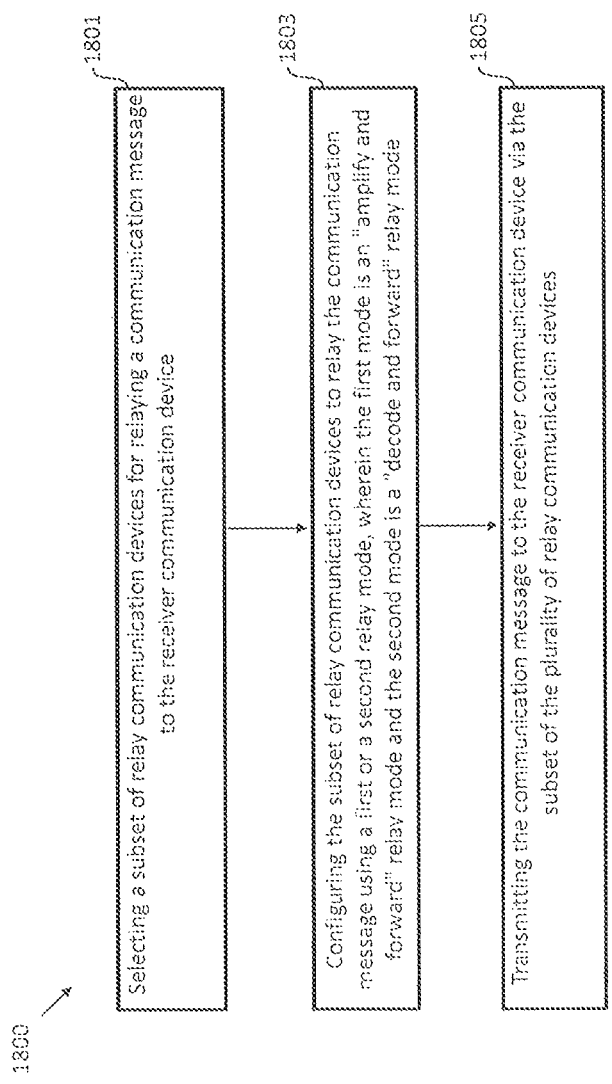
FIG. 18 shows a schematic diagram illustrating a method of operating a transmitter communication device in a D2D communication network according to an embodiment.

FIG. 18 shows a schematic diagram illustrating a method 1800 of operating the transmitter communication device 101 of the D2D communication network 100. The method 1800 comprises the steps of: selecting 1801 a subset of the plurality of relay communication devices 102 for relaying a communication message to the one or more receiver communication devices 103-1, 103-2; configuring 1803 the subset of relay communication devices 102 to relay the communication message using one of a plurality of relay modes, including a first relay mode and a second relay mode, wherein the first relay mode is an "amplify and forward" relay mode and wherein the second relay mode is a "decode and forward" relay mode; and transmitting 1805 the communication message to the one or more receiver communication devices 103-1, 103-2 via the subset of the plurality of relay communication devices 102.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. A transmitter communication device for a device-to-device (D2D) communication network, the D2D communication network comprising a plurality of communication devices, including one or more receiver communication devices and a plurality of relay communication devices, the transmitter communication device comprising:
    a processor configured to:
        select a subset of relay communication devices from the plurality of relay communication devices for relaying a communication message to the one or more receiver communication devices, wherein the processor is configured to select the subset of relay communication devices, based on information about at least one of a position or a velocity of each relay communication device in the plurality of relay communication devices, by predicting, for each relay communication device, a first channel quality of a D2D communication channel between the transmitter communication device and the relay communication device and a second channel quality of a D2D communication channel between the relay communication device and a receiver communication device from the one or more receiver communication devices; and
        configure the subset of relay communication devices to relay the communication message using one of a plurality of relay modes including a first relay mode and a second relay mode, wherein the first relay mode is an amplify and forward relay mode and the second relay mode is a decode and forward relay mode; and
    a communication interface configured to transmit the communication message to the one or more receiver communication devices via the subset of relay communication devices.

2. The transmitter communication device of claim 1, wherein the processor is further configured to estimate a quality measure of a D2D communication channel between the transmitter communication device and a first receiver communication device, wherein the quality measure comprises a signal-to-noise ratio or a packet reception probability, and
    wherein the communication interface is further configured to transmit the communication message without the relay communication devices to the first receiver communication device in response to the quality measure being larger than a quality measure threshold.

3. The transmitter communication device of claim 1, wherein the processor is further configured to:
    select the subset of relay communication devices based on a respective quality measure associated with each relay communication device in the plurality of relay communication devices, wherein the respective quality measure for a respective relay communication device is a signal-to-noise ratio and is based on a quality of a D2D communication channel between the transmitter communication device and the respective relay communication device and on a quality of a D2D communication channel between the respective relay communication device and the receiver communication device from the one or more receiver communication devices.

4. The transmitter communication device of claim 3, wherein the processor is configured to select the subset of relay communication devices by selecting the relay communication devices for which the associated signal-to-noise ratio leads to an estimate of a block error rate based on a Polyanskiy bound or a variant thereof that is smaller than a block error rate threshold.

5. The transmitter communication device of claim 1, wherein the processor is configured to implement a Kalman filter, and wherein the Kalman filter is configured to predict, for each relay communication device, the first channel quality and the second channel quality based on a device position and at least one of a velocity mobility model or a path loss model.

6. The transmitter communication device of claim 1, wherein the processor is configured to extract the information about the at least one of the position or the velocity of each relay communication device from one or more Cooperative Awareness Messages received via the communication interface from the plurality of relay communication devices.

7. The transmitter communication device of claim 1, wherein configuring the subset of relay communication devices comprises transmitting, via the communication interface, a first control message for informing the subset of relay communication devices to relay the communication message using the first relay mode.

8. The transmitter communication device of claim 7, wherein the first control message further comprises at least one of information for identifying one or more communication resource blocks for transmitting the communication message, information about a signal power for relaying the communication message using the first relay mode, or an expiration timer.

9. The transmitter communication device of claim 7, wherein, after transmitting the first control message and in response to receiving information that the receiver communication device was not able to decode the communication message, the processor is further configured to re-configure the subset of relay communication devices to transmit via the communication interface a second control message for informing the subset of relay communication devices to relay the communication message to the receiver communication device using the second relay mode.

10. The transmitter communication device of claim 9, wherein the second control message further comprises at least one of information for identifying one or more communication resource blocks for transmitting the communication message, information about a signal power for relaying the communication message using the second relay mode, or an expiration timer.

11. The transmitter communication device of claim 9, wherein the processor is further configured to re-configure the subset of relay communication devices by defining pairs of relay communication devices of the subset of relay communication devices, wherein the pairs of relay communication devices are configured to relay the communication message using the second relay mode based on an Alamouti precoding technique or a variant thereof.

12. The transmitter communication device of claim 11, wherein the second control message further comprises information about an assignment of each relay communication device to a pair of relay communication devices.

13. The transmitter communication device of claim 1,
wherein the plurality of relay modes further comprises a third relay mode, and
wherein the third relay mode comprises a time domain equalization and forwarding of the communication message.

14. A method of operating a transmitter communication device for a device-to-device (D2D) communication network, the D2D communication network comprising a plurality of communication devices, including one or more receiver communication devices and a plurality of relay communication devices, the method comprising:
selecting a subset of relay communication devices from the plurality of relay communication devices for relaying a communication message to the one or more receiver communication devices, wherein the selecting the subset of relay communication devices comprises, based on information about at least one of a position or a velocity of each relay communication device in the plurality of relay communication devices, predicting, for each relay communication device, a first channel quality of a D2D communication channel between the transmitter communication device and the relay communication device and a second channel quality of a D2D communication channel between the relay communication device and a receiver communication device from the one or more receiver communication devices;
configuring the subset of relay communication devices to relay the communication message using one of a plurality of relay modes including a first relay mode and a second relay mode, wherein the first relay mode is an amplify and forward relay mode and the second relay mode is a decode and forward relay mode; and
transmitting the communication message to the one or more receiver communication devices via the subset of relay communication devices.

15. The method of claim 14, further comprising:
extracting the information about the at least one of the position or the velocity of each relay communication device from one or more Cooperative Awareness Messages received from the plurality of relay communication devices.

16. The method of claim 14, wherein the plurality of relay modes comprises a third relay mode,
wherein the third relay mode comprises a time domain equalization and forwarding of the communication message.

17. A non-transitory medium storing a computer program comprising program code that, when executed on a computer, performs a method of operating a transmitter communication device for a device-to-device (D2D) communication network, the D2D communication network comprising a plurality of communication devices, including one or more receiver communication devices and a plurality of relay communication devices, the method comprising:
selecting a subset of relay communication devices from the plurality of relay communication devices for relaying a communication message to the one or more receiver communication devices, wherein the selecting the subset of relay communication devices comprises, based on information about at least one of a position or a velocity of each relay communication device in the plurality of relay communication devices, predicting, for each relay communication device, a first channel quality of a D2D communication channel between the transmitter communication device and the relay communication device and a second channel quality of a D2D communication channel between the relay communication device and a receiver communication device from the one or more receiver communication devices;
configuring the subset of relay communication devices to relay the communication message using one of a plurality of relay modes including a first relay mode and a second relay mode, wherein the first relay mode is an amplify and forward relay mode and the second relay mode is a decode and forward relay mode; and
transmitting the communication message to the one or more receiver communication devices via the subset of relay communication devices.

18. The non-transitory medium of claim 17, wherein the method further comprises:
extracting the information about the at least one of the position or the velocity of each relay communication device from one or more Cooperative Awareness Messages received from the plurality of relay communication devices.

19. The non-transitory medium of claim 17, wherein the plurality of relay modes comprises a third relay mode,
wherein the third relay mode comprises a time domain equalization and forwarding of the communication message.

* * * * *